(12) United States Patent
Yang et al.

(10) Patent No.: US 11,975,493 B2
(45) Date of Patent: May 7, 2024

(54) ADHESIVE TAPE ATTACHING DEVICE FOR CELL AND MANUFACTURING METHOD FOR ADHESIVE TAPE ATTACHING DEVICE FOR CELL

(71) Applicant: JIANGSU CONTEMPORARY AMPEREX TECHNOLOGY LIMITED, Changzhou (CN)

(72) Inventors: Kun Yang, Changzhou (CN); Gang Lin, Changzhou (CN); Xiang Fan, Changzhou (CN); Tengteng Wang, Changzhou (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 0 days.

(21) Appl. No.: 18/341,789

(22) Filed: Jun. 27, 2023

(65) Prior Publication Data
US 2023/0330945 A1    Oct. 19, 2023

Related U.S. Application Data

(63) Continuation of application No. PCT/CN2022/123862, filed on Oct. 8, 2022.

(30) Foreign Application Priority Data

Oct. 26, 2021  (CN) .......................... 202111250112.9

(51) Int. Cl.
*B65H 16/00*    (2006.01)
*B29C 65/50*    (2006.01)
(Continued)

(52) U.S. Cl.
CPC ....... *B29C 65/5092* (2013.01); *B65H 16/005* (2013.01); *B65H 35/0013* (2013.01);
(Continued)

(58) Field of Classification Search
CPC ............. B65H 37/002; B65H 35/0086; B65H 35/008; B65H 35/0066; B65H 35/006;
(Continued)

(56) References Cited

U.S. PATENT DOCUMENTS

| | | | | |
|---|---|---|---|---|
| 3,636,408 A | * | 1/1972 | Shuman ................... | H05F 3/02 242/906 |
| 4,719,397 A | * | 1/1988 | Kneifel, II .......... | G05B 19/371 318/567 |
| 2002/0079042 A1 | * | 6/2002 | Hartman ............ | B65H 35/0066 156/304.3 |

FOREIGN PATENT DOCUMENTS

| | | | |
|---|---|---|---|
| CN | 103950266 A | * | 7/2014 |
| CN | 103950266 A | | 7/2014 |

(Continued)

OTHER PUBLICATIONS

International Search Report received in the corresponding International Application PCT/CN2022/123862, dated Jan. 3, 2023.
(Continued)

*Primary Examiner* — Alex B Efta
(74) *Attorney, Agent, or Firm* — Kilpatrick Townsend & Stockton LLP

(57) ABSTRACT

Provided are an adhesive tape attaching device for cell and a manufacturing method for the adhesive tape attaching device for cell. The adhesive tape attaching device for cell includes a tooling plate, an adhesive tape clamping and pulling mechanism, an adhesive tape cutting mechanism, an adhesive tape attaching mechanism, and a driving mechanism. The tooling plate is for carrying a cell; the adhesive tape clamping and pulling mechanism is configured to clamp an adhesive tape and drive the adhesive tape to move in a horizontal direction approaching the cell; the adhesive tape cutting mechanism is disposed in a transportation direction of the adhesive tape, the adhesive tape cutting mechanism is (Continued)

located upstream of the tooling plate, and the adhesive tape cutting mechanism is configured to cut the adhesive tape into adhesive tape segments; the adhesive tape attaching mechanism is configured to attach the adhesive tape segment onto a to-be-attached region.

17 Claims, 7 Drawing Sheets

(51) Int. Cl.
*B65H 35/00* (2006.01)
*H01M 10/04* (2006.01)
*B29L 31/34* (2006.01)

(52) U.S. Cl.
CPC .................. *H01M 10/0404* (2013.01); *B29L 2031/3468* (2013.01); *B65H 2801/72* (2013.01)

(58) Field of Classification Search
CPC ........... B65H 35/0013; B65H 35/0006; B65H 35/00; B65H 16/005
See application file for complete search history.

(56) References Cited

FOREIGN PATENT DOCUMENTS

| | | |
|---|---|---|
| CN | 108231437 A | 6/2018 |
| CN | 109605832 A | 4/2019 |
| CN | 211641152 U | 10/2020 |
| CN | 211920382 U | 11/2020 |
| CN | 214378534 U | 10/2021 |
| JP | 2008004884 A | 1/2008 |

OTHER PUBLICATIONS

Written Opinion received in the corresponding International Application PCT/CN2022/123862, dated Jan. 3, 2023.

* cited by examiner

ADHESIVE TAPE ATTACHING DEVICE FOR CELL AND MANUFACTURING METHOD FOR ADHESIVE TAPE ATTACHING DEVICE FOR CELL

CROSS-REFERENCE TO RELATED APPLICATIONS

This application is a continuation of International Application PCT/CN2022/123862, filed Oct. 8, 2022, which claims priority to Chinese Patent Application No. 202111250112.9, filed on Oct. 26, 2021 and entitled "ADHESIVE TAPE ATTACHING DEVICE FOR CELL AND MANUFACTURING METHOD FOR ADHESIVE TAPE ATTACHING DEVICE FOR CELL", which is incorporated herein by reference in its entirety.

TECHNICAL FIELD

This application relates to the technical field of electrochemical apparatuses, and in particular, to an adhesive tape attaching device for cell and a manufacturing method for the adhesive tape attaching device for cell.

BACKGROUND

Due to advantages such as high energy density and light weight, lithium batteries have been widely used in portable electronic devices, electric vehicles, and other technical fields. During a production process of a lithium battery, it is necessary to weld a tab of a cell of the lithium battery, and after the tab is welded, it is necessary to attach an adhesive tape onto a welded part to fix and insulate the tab.

SUMMARY

Embodiments of this application are intended to provide an adhesive tape attaching device for cell and a manufacturing method for the adhesive tape attaching device for cell.

A first aspect of an embodiment of this application provides an adhesive tape attaching device for cell. The adhesive tape attaching device for cell includes: a tooling plate, configured for carrying a cell; an adhesive tape clamping and pulling mechanism, located above the tooling plate, where the adhesive tape clamping and pulling mechanism is configured to clamp an adhesive tape and drive the adhesive tape to move in a horizontal direction approaching the cell; an adhesive tape cutting mechanism, disposed in a transportation direction of the adhesive tape, where the adhesive tape cutting mechanism is located upstream of the tooling plate, and the adhesive tape cutting mechanism is configured to cut the adhesive tape into adhesive tape segments; an adhesive tape attaching mechanism, located above the tooling plate, where the adhesive tape attaching mechanism is configured to attach the adhesive tape segment onto a to-be-attached region; and a driving mechanism, where the driving mechanism is connected to the adhesive tape clamping and pulling mechanism, the adhesive tape cutting mechanism, and the adhesive tape attaching mechanism, to synchronously drive the adhesive tape clamping and pulling mechanism, the adhesive tape cutting mechanism, and the adhesive tape attaching mechanism.

According to the adhesive tape attaching device for cell of this embodiment of this application, driven by the adhesive tape clamping and pulling mechanism, the adhesive tape passes the adhesive tape cutting mechanism and the adhesive tape attaching mechanism in sequence, and is attached onto the cell under an action of the adhesive tape attaching mechanism. A transportation path of the adhesive tape is short, and cooperation between the mechanisms is close, which increases adhesive tape attaching efficiency of the adhesive tape attaching device for cell. In addition, the driving mechanism uses a same motor to synchronously drive a plurality of mechanisms, which reduces the volume and energy consumption of the adhesive tape attaching device for cell on the basis of further improving working efficiency of the adhesive tape attaching device for cell.

A second aspect of an embodiment of this application provides a manufacturing method for an adhesive tape attaching device for cell. The manufacturing method includes: providing a tooling plate, where the tooling plate is configured for carrying a cell; providing an adhesive tape clamping and pulling mechanism, where the adhesive tape clamping and pulling mechanism is located above the tooling plate, and the adhesive tape clamping and pulling mechanism is configured to clamp an adhesive tape and drive the adhesive tape to move in a horizontal direction approaching the cell; providing an adhesive tape cutting mechanism, disposed in a transportation direction of the adhesive tape, where the adhesive tape cutting mechanism is located in front of the tooling plate, and the adhesive tape cutting mechanism is configured to cut the adhesive tape into adhesive tape segments; providing an adhesive tape attaching mechanism, where the adhesive tape attaching mechanism is located above the tooling plate, and the adhesive tape attaching mechanism is configured to attach the adhesive tape segment onto the cell; and providing a driving mechanism, where the driving mechanism is connected to the adhesive tape clamping and pulling mechanism, the adhesive tape cutting mechanism, and the adhesive tape attaching mechanism, to synchronously drive the adhesive tape clamping and pulling mechanism, the adhesive tape cutting mechanism, and the adhesive tape attaching mechanism.

BRIEF DESCRIPTION OF DRAWINGS

To describe the technical solutions in the embodiments of this application more clearly, the following briefly describes the accompanying drawings required for describing the embodiments. Apparently, the accompanying drawings in the following descriptions show merely some embodiments of this application, and persons of ordinary skill in the art may still derive other embodiments from the accompanying drawings.

DESCRIPTION OF EMBODIMENTS

Figure 1:
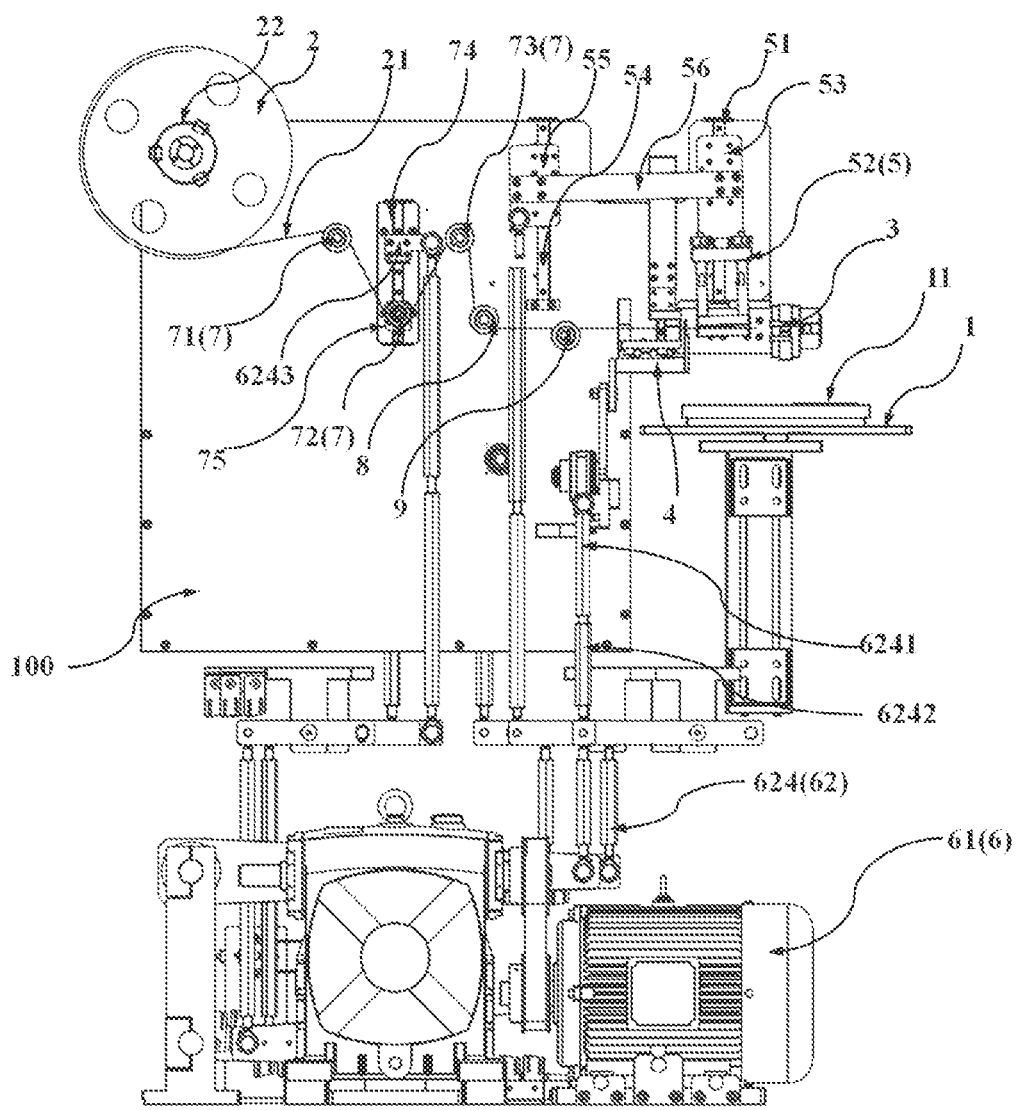
FIG. 1 is a front view of an adhesive tape attaching device for cell according to some embodiments of this application.

The following clearly and completely describes the technical solutions in the embodiments of this application with reference to the accompanying drawings in the embodiments of this application. Apparently, the described embodiments are only some but not all of the embodiments of this application. Based on the embodiments of this application, all other embodiments obtained by persons of ordinary skill in the art based on this application shall fall within the protection scope of this application.

In the description of this application, it should be noted that, unless otherwise stated, "a plurality of" means at least two; and the orientations or positional relationships indicated by the terms "upper", "lower", "left", "right", "inside", "outside", and the like are merely for ease and brevity of description of this application rather than indicating or implying that the apparatuses or components mentioned must have specific orientations or must be constructed or manipulated according to specific orientations. These terms shall therefore not be construed as limitations on this application. In addition, the terms "first", "second", "third", and the like are merely for the purpose of description and shall not be understood as any indication or implication of relative importance. "Perpendicular" is not perpendicular in the strict sense but within an allowable range of error. "Parallel" is not parallel in the strict sense but within an allowable range of error.

The orientation terms appearing in the following description all refer to the orientations shown in the drawings, and do not limit the specific structure of this application. In the description of this application, it should also be noted that, unless otherwise specified and defined explicitly, the terms "mount", "connect", and "join" should be understood in their general senses. For example, they may refer to a fixed connection, a detachable connection, or an integral connection, and may refer to a direct connection or an indirect connection via an intermediate medium. Persons of ordinary skill in the art can understand specific meanings of these terms in this application as appropriate to specific situations.

The term "and/or" in this application is only an associative relationship for describing associated objects, indicating that three relationships may be present. For example, A and/or B may indicate three cases: presence of only A; presence of both A and B; and presence of only B. In addition, the character "/" in this application generally indicates an "or" relationship between contextually associated objects.

In the embodiments of this application, the same reference signs denote the same components. For brevity, in different embodiments, detailed descriptions of the same components are not repeated. It should be understood that, as shown in the accompanying drawings, sizes such as thickness, length, and width of various components and sizes such as overall thickness, length, and width of integrated devices in the embodiments of this application are merely for illustrative purposes and should not constitute any limitations on this application.

In this application, "a plurality of" means more than two (inclusive).

The cell mentioned in the embodiments of this application may also be referred to as a battery cell, and the battery cell is configured to form a battery. The battery may include one or more battery cells to provide a higher voltage and capacity. A battery typically includes a box configured to enclose one or more battery cells. The box can prevent liquids or other foreign matters from affecting charging or discharging of the cell. In this application, the battery cell may include an aluminum-shell cell, a pouch cell, a cylindrical cell, and the like. This is not limited in the embodiments of this application. The battery cell may be cylindrical, flat, cuboid, or of other shapes. This is not limited in the embodiments of this application either.

A plurality of batteries may be connected in series and/or in parallel through a pole for various application scenarios. In some high-power application scenarios such as an electric vehicle, the application of the battery includes three levels: a battery cell, a battery module, and a battery pack. The battery module is formed by electrically connecting a specific quantity of battery cells and putting the battery cells into a frame to protect the battery cells from external impact, heat, vibration, and the like. The battery pack is a final state of a battery system assembled in an electric vehicle. A battery pack typically includes a box configured to enclose one or more battery cells. The box can prevent liquids or other foreign matters from affecting charging or discharging of the battery cell. A box typically includes a cover and a box housing. Most existing battery packs are formed by assembling various control and protection systems such as a battery management system (BMS) and a thermal management component on one or more battery modules. With the development of technologies, the battery module may be omitted, that is, the battery pack is directly formed using battery cells. With this improvement, weight energy density and volumetric energy density of the battery system are improved, and a quantity of components is remarkably reduced. The battery mentioned in this application includes a battery module or a battery pack.

The technical solutions described in the embodiments of this application are applicable to various apparatuses that use batteries, for example, mobile phones, portable devices, notebook computers, electric bicycles, electric toys, electric tools, electric vehicles, ships, and spacecrafts. For example, spacecrafts include airplanes, rockets, space shuttles, and spaceships.

In related technologies, a battery cell includes an electrode assembly, a cell housing, and an electrode terminal connected to the electrode assembly and led out of the cell housing, where the electrode terminal may also be referred to as a tab. During a production process of a battery, it is necessary to space apart a positive electrode plate and a negative electrode plate to form a cell. After the cell is formed, it is necessary to weld a tab of the cell, and after the tab is welded, it is necessary to tape an adhesive tape onto a welded part of the tab, to fix and insulate the tab of the cell. an adhesive tape attaching device for cell needs to complete processes such as pulling an adhesive tape, pressing the adhesive tape, and cutting the adhesive tape, and therefore the adhesive tape attaching device for cell includes a plurality of mechanisms. However, in a current adhesive tape attaching device for cell, cooperation between various mechanisms is not close, causing low adhesive tape attaching efficiency. In addition, the plurality of mechanisms need to be driven by different driving apparatuses, resulting in a large volume and high energy consumption of the adhesive tape attaching device for cell.

Based on the foregoing problems of the adhesive tape attaching device for cell, the inventors have developed a new adhesive tape attaching device for cell, that is, the adhesive tape attaching device for cell of this application. A same driving mechanism synchronously drives a plurality of mechanisms, reducing the volume and energy consumption of the adhesive tape attaching device for cell on the basis of improving working efficiency of the adhesive tape attaching device for cell.

In the following description, "horizontal direction" and "vertical direction" refer to a horizontal direction and a vertical direction shown in FIG. 1.

As shown in FIG. 1 to FIG. 5, an adhesive tape attaching device for cell according to an embodiment of a first aspect of this application includes a tooling plate 1, an adhesive tape clamping and pulling mechanism 3, an adhesive tape cutting mechanism 4, an adhesive tape attaching mechanism 5, and a driving mechanism 6. The tooling plate 1 is configured for carrying a cell 11. The adhesive tape clamping and pulling mechanism 3 is located above the tooling plate 1, where the adhesive tape clamping and pulling mechanism 3 is configured to clamp an adhesive tape 21 and drive the adhesive tape 21 to move in a horizontal direction approaching the cell 11. The adhesive tape cutting mechanism 4 is disposed in a transportation direction of the adhesive tape 21, the adhesive tape cutting mechanism 4 is located in front of the tooling plate 1, and the adhesive tape cutting mechanism 4 is configured to cut the adhesive tape 21 into adhesive tape segments. The adhesive tape attaching mechanism 5 is located above the tooling plate 1, and the adhesive tape attaching mechanism 5 is configured to attach the adhesive tape segment onto the cell 11. The driving mechanism 6 includes a motor 61 and a transmission assembly 62, and the motor 61 is connected, through the transmission assembly 62, to the adhesive tape clamping and pulling mechanism 3, the adhesive tape cutting mechanism 4, and the adhesive tape attaching mechanism 5, to synchronously drive the adhesive tape clamping and pulling mechanism 3, the adhesive tape cutting mechanism 4, and the adhesive tape attaching mechanism 5.

In this embodiment of this application, there is a to-be-attached region on the cell 11, and the to-be-attached region of the cell 11 may be a tab region of the cell 11, or may be each side surface of a body of the cell 11. This is not specifically limited in this embodiment of this application. The adhesive tape attaching mechanism 5 is configured to attach the adhesive tape onto the to-be-attached region of the cell 11.

During adhesive tape attaching for the cell 11 using the adhesive tape attaching device for cell provided in this embodiment of this application, the motor 61 in the driving mechanism 6 drives, through the transmission assembly 62, the adhesive tape clamping and pulling mechanism 3 to clamp the adhesive tape 21 and drive the adhesive tape 21 to move horizontally, so that the adhesive tape 21 moves in a direction approaching the tooling plate 1 and the cell 11. In addition, the driving mechanism 6 controls the adhesive tape cutting mechanism 4 to move in a direction horizontal and perpendicular to a side of the adhesive tape 21, and to cut the adhesive tape 21 transported to the adhesive tape cutting mechanism 4 into adhesive tape segments. After the adhesive tape 21 is cut by the adhesive tape cutting mechanism 4, a clamping jaw 33 of the adhesive tape clamping and pulling mechanism 3 is opened, and then the adhesive tape attaching mechanism 5 presses the adhesive tape 21 toward the cell 11, so that the cut adhesive tape segment is attached onto the to-be-attached region of the cell 11, for example, being attached on a tab of the cell 11, to implement adhesive tape attaching for the cell 11.

In the adhesive tape attaching device for cell provided in this embodiment of this application, adhesive tape attaching for the cell 11 is implemented by the adhesive tape clamping and pulling mechanism 3, the adhesive tape cutting mechanism 4, and the adhesive tape attaching mechanism 5, featuring a high degree of automation. Driven by the adhesive tape clamping and pulling mechanism 3 on the cell 11, the adhesive tape 21 passes the adhesive tape cutting mechanism 4 and the adhesive tape attaching mechanism 5 in sequence, and is attached onto the cell 11 under an action of the adhesive tape attaching mechanism 5. A transportation path of the adhesive tape 21 is short, and cooperation between the mechanisms is close, which increases adhesive tape attaching efficiency of the adhesive tape attaching device for cell. In addition, the driving mechanism 6 uses a same motor 61 to synchronously drive a plurality of mechanisms, which reduces the volume and energy consumption of the adhesive tape attaching device for cell on the basis of further improving working efficiency of the adhesive tape attaching device for cell.

Figure 2:
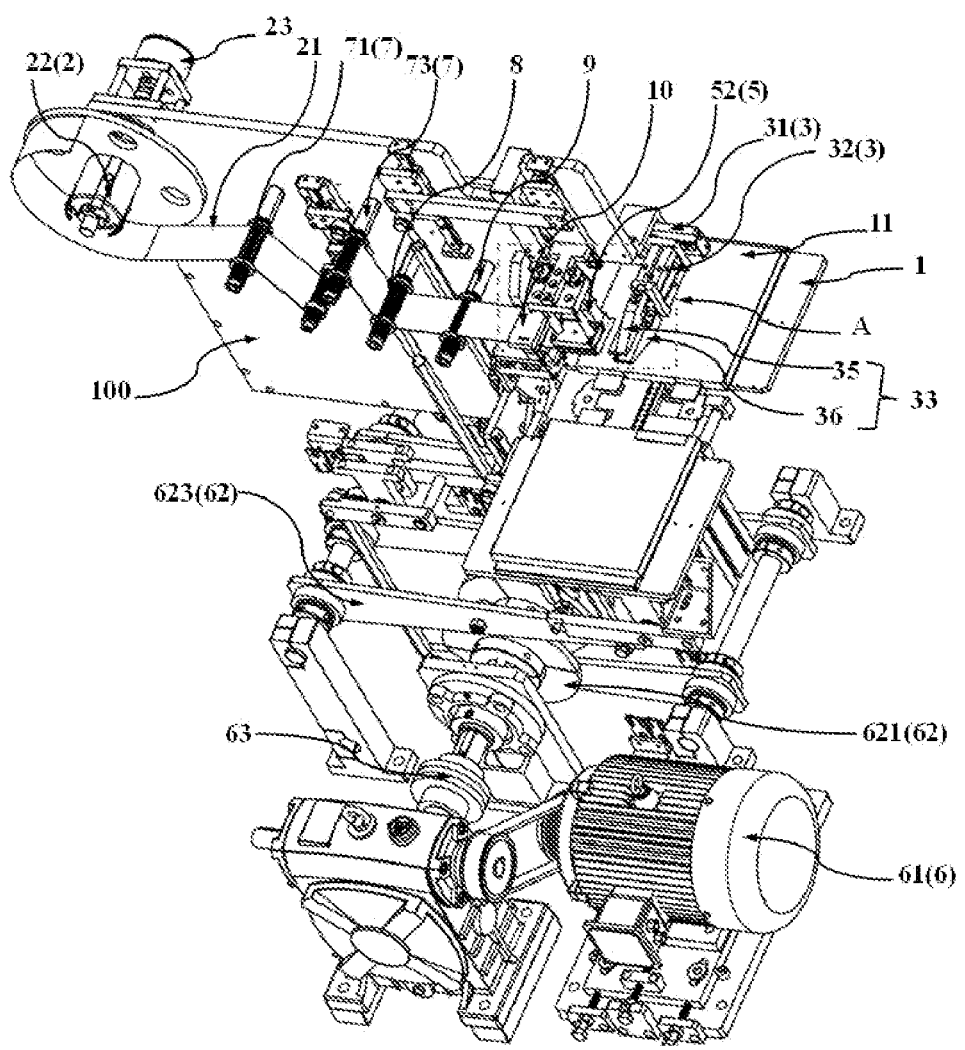
FIG. 2 is a structural diagram of an adhesive tape attaching device for cell according to some embodiments of this application.

In some embodiments, as shown in FIG. 2, the driving mechanism 6 further includes a cylinder assembly (not shown in the figure). The adhesive tape clamping and pulling mechanism 3 includes a first clamping block 35 and a second clamping block 36, and the cylinder assembly is connected to the first clamping block 35 and/or the second clamping block 36, to drive the first clamping block 35 and/or the second clamping block 36 to move in a vertical direction.

In the embodiments of this application, the adhesive tape 21 is located between the first clamping block 35 and the second clamping block 36 in a vertical direction, and the cylinder assembly is configured to drive the first clamping block 35 and/or the second clamping block 36 to move in a vertical direction, so that the first clamping block 35 and the second clamping block 36 together clamp the adhesive tape 21. In an example, the first clamping block 35 may be fixed, and when the adhesive tape 21 needs to be clamped, the cylinder assembly drives the second clamping block 36 to move in a direction approaching the first clamping block 35 until the first clamping block 35 and the second clamping block 36 can clamp the adhesive tape 21. Correspondingly, when the adhesive tape 21 needs to be released, the second clamping block 36 is controlled to move in a direction leaving the first clamping block 35 to release the adhesive tape 21. In another example, the second clamping block 36 may be fixed, and when the adhesive tape 21 needs to be clamped, the cylinder assembly is configured to drive the first clamping block 35 to move in a direction approaching the second clamping block 36 until the first clamping block 35 and the second clamping block 36 can clamp the adhesive tape 21. Correspondingly, when the adhesive tape 21 needs to be released, the first clamping block 35 is controlled to move in a direction leaving the second clamping block 36 to release the adhesive tape 21. In yet another example, the cylinder assembly may drive the first clamping block 35 and the second clamping block 36 to move, and when the adhesive tape 21 needs to be clamped, the cylinder assembly drives the first clamping block 35 and the second clamping block 36 to move in directions approaching each other until the first clamping block 35 and the second clamping block 36 can clamp the adhesive tape 21. Correspondingly, when the adhesive tape 21 needs to be released, the first clamping block 35 and the second clamping block 36 are controlled to move in directions leaving each other to release the adhesive tape 21.

In some embodiments, as shown in FIG. 1, the adhesive tape attaching device for cell further includes an adhesive tape preparation mechanism 2. The adhesive tape preparation mechanism 2 is located on a side of the adhesive tape cutting mechanism 4 leaving the tooling plate 1, and the adhesive tape preparation mechanism 2 is configured to carry the adhesive tape 21 and transport the adhesive tape 21 in a direction approaching the tooling plate 1. The adhesive tape preparation mechanism 2 is configured to carry a roll of adhesive tape 21. When a pulling force in a direction leaving the adhesive tape preparation mechanism 2 is applied to the adhesive tape 21 by the adhesive tape clamping and pulling mechanism 3, the roll of adhesive tape 21 rotates under an action of the pulling force, thereby implementing separation of the adhesive tape 21 and transporting part of the adhesive tape 21 in a direction approaching the tooling plate 1 and the cell 11, to tape the cell 11.

In some embodiments, the transmission assembly 62 includes a cam driving group.

Figure 4:
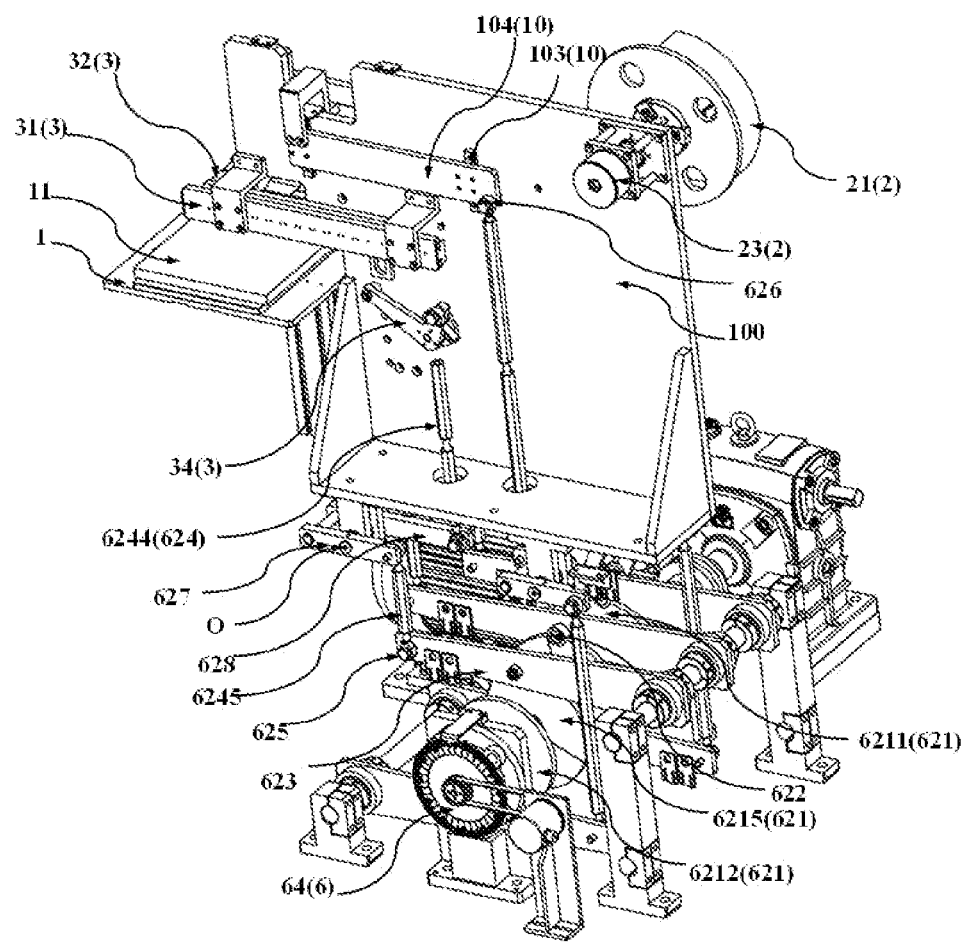
FIG. 4 is another structural diagram of an adhesive tape attaching device for cell according to some embodiments of this application.

In some embodiments, as shown in FIG. 2 and FIG. 4, the cam driving group includes a cam 621, a rolling wheel 622, a first connecting plate 623, and a connecting rod 624. The rolling wheel 622 is disposed on the first connecting plate 623, and the cam 621 abuts against the rolling wheel 622. One end of the connecting rod 624 is connected to the first connecting plate 623, and the other end of the connecting rod 624 is connected to a to-be-driven mechanism. The cam 621 drives, through the rolling wheel 622 and the first connecting plate 623, the connecting rod 624 to move in a vertical direction. The to-be-driven mechanism is at least one of the adhesive tape clamping and pulling mechanism 3, the adhesive tape cutting mechanism 4, and the adhesive tape attaching mechanism 5.

Figure 6:
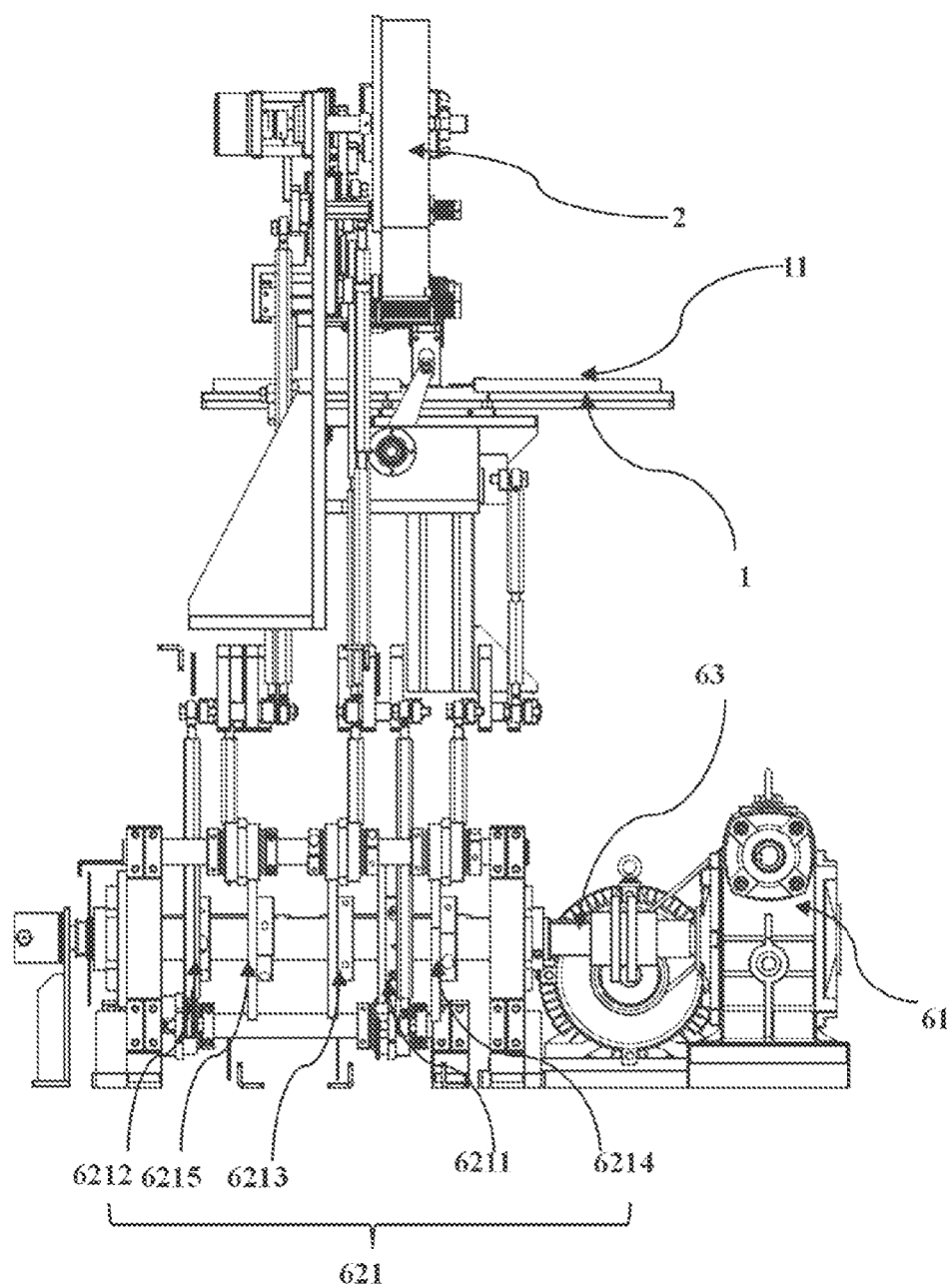
FIG. 6 is a side view of an adhesive tape attaching device for cell according to some embodiments of this application.

In the embodiments of this application, the cam driving group may include a plurality of cams 621, and a quantity of cams 621 corresponds to a quantity of mechanisms in the adhesive tape attaching device for cell or a quantity of to-be-driven assemblies in a plurality of mechanisms. Specifically, as shown in FIG. 6, the plurality of cams 621 include a first cam 6211, a second cam 6212, a third cam 6213, a fourth cam 6214, and a fifth cam 6215. Connection states between the first cam 6211, the second cam 6212, the third cam 6213, the fourth cam 6214, and the fifth cam 6215 and the to-be-driven mechanisms are described below with reference to structures of the to-be-driven mechanisms, and are not described in detail herein.

In some embodiments, as shown in FIG. 2, the driving mechanism 6 may further include an output shaft 63 connected to the motor 61. The output shaft 63 is connected to the plurality of cams 621, and the motor 61 drives the output shaft 63 to rotate, so that the plurality of cams 621 fixed onto the output shaft 63 rotate synchronously, thereby implementing synchronous driving by the motor 61 to the mechanisms in the adhesive tape attaching device for cell. Connection states between the mechanisms and the cam 621 are described below with reference to specific structures of the mechanisms such as the adhesive tape clamping and pulling mechanism 3, the adhesive tape cutting mechanism 4, and the adhesive tape attaching mechanism 5, and are not described in detail herein. The motor 61 drives the plurality of cams 621 through the output shaft 63, and then the plurality of cams 621 drive the connecting rods 624 connected to the cams 621 to perform cyclic linear motion. The plurality of cams 621 move synchronously, and the plurality of cams 621 do not interfere with each other, so that stability of the cam driving group is high.

In some embodiments, the motor 61 drives the plurality of cams 621 to rotate synchronously through the output shaft 63, thereby driving the to-be-driven mechanisms connected to the cams 621 to operate. When the output shaft 63 rotates one rotation, the plurality of cams 621 rotate one rotation correspondingly, and the driving mechanisms together complete an adhesive tape attaching process, so that the adhesive tape attaching device for cell has high stability and sustainability.

In addition, the rolling wheel 622 and the connecting rod 624 are arranged on the first connecting plate 623, and the first connecting plate 623 transmits between the cam 621 and the connecting rod 624, which further increases stability of the cam driving group during moving. In some embodiments, the connecting rod 624 may alternatively be directly connected to the cam 621 through the rolling wheel 622, which is not specifically limited in the embodiments of this application.

In some embodiments, the output shaft 63 in the driving mechanism 6 is an output shaft with a worm gear. The cam driving group is driven by the output shaft with the worm gear, which increases a reduction ratio of the cam driving group, makes a torque of the output shaft 63 large, and increases sustainability of movement of the connecting rod 624.

In some embodiments, as shown in FIG. 1 and FIG. 4, the connecting rod 624 includes a first section 6241 and a second section 6242, where the first section 6241 is threadedly connected to the second section 6242, and a depth of the threaded connection between the first section 6241 and the second section 6242 is adjustable. Specifically, as shown in FIG. 1 and FIG. 4, an upper end of the first section 6241 is connected to the to-be-driven mechanism, and a lower end of the second section 6242 is connected to the first connecting plate 623. Because a screw-in depth of the first section 6241 and the second section 6242 is adjustable, an overall length of the connecting rod 624 can be adjusted by adjusting the screw-in depth of the first section 6241 and the second section 6242. Therefore, an initial moving position and an action completion position of the connecting rod 624 can be changed without replacing the connecting rod 624, so that the initial moving position and the action completion position of the connecting rod 624 can be precisely adjusted.

In some embodiments, as shown in FIG. 4, the cam driving group includes a first rod end bearing 625 and a second rod end bearing 626, where one end of the connecting rod 624 is connected to the first connecting plate 623 through the first rod end bearing 625, and the other end of the connecting rod 624 is connected to the to-be-driven mechanism through the second rod end bearing 626.

In the embodiments of this application, the to-be-driven mechanism may be the adhesive tape clamping and pulling mechanism 3, the adhesive tape cutting mechanism 4, and the adhesive tape attaching mechanism 5 that are of the adhesive tape attaching device for cell. Both the first rod end bearing 625 and the second rod end bearing 626 include a rod end and a bearing end. As shown in FIG. 4, the rod end of the first rod end bearing 625 is connected to one end of the connecting rod 624, and the bearing end of the first rod end bearing 625 may be connected to the first connecting plate 623 through a fastener such as a bolt and a screw. Correspondingly, the rod end of the second rod end bearing 626 is connected to the other end of the connecting rod 624, and the bearing end of the second rod end bearing 626 is connected to the to-be-driven mechanism. There are various manners to connect the first rod end bearing 625 and the second rod end bearing 626 to the connecting rod 624, which are not specifically limited in the embodiments of this application.

In some embodiments, the first rod end bearing 625 and the second rod end bearing 626 are threadedly connected to the connecting rod 624, and depths of the threaded connections between the connecting rod 624 and the first rod end bearing 625 and the second rod end bearing 626 are adjustable. Depths of two ends of the connecting rod 624 that are screwed into the first rod end bearing 625 and the second rod end bearing 626 are adjusted, so that a distance between the first rod end bearing 625 and the second rod end bearing 626 can be adjusted. Therefore, the initial moving position and the action completion position of the connecting rod 624 can be changed without replacing the connecting rod 624, so that the initial moving position and the action completion position of the connecting rod 624 can be precisely adjusted.

In some embodiments, connection manners of the first rod end bearing 625 and the second rod end bearing 626 and the connecting rod 624 are key connections or interference connections.

In some embodiments, the first rod end bearing 625 and the second rod end bearing 626 are connected to the connecting rod 624 through welding.

In some embodiments, the driving mechanism 6 further includes an encoder 64, and the encoder 64 is configured to control a rotation angle of the cam 621. As shown in FIG. 4, the encoder 64 is disposed on the output shaft 63. The encoder 64 is configured to monitor a rotation angle of the output shaft 63, to determine rotation angles of a plurality of cams disposed on the output shaft 63 at a specific moment or within a preset time period, thereby increasing accuracy and consistency of positions of the cams 621 during work, and reducing the possibility of bumping between the cams 621 due to misalignment of positions of one or more cams 621. The encoder 64 includes but is not limited to an incremental encoder, an absolute encoder, a hybrid absolute encoder, and the like.

In some embodiments, as shown in FIG. 1 and FIG. 2, the adhesive tape preparation mechanism 2 includes an adhesive tape mounting roller 22 and a brake 23 connected to the adhesive tape mounting roller 22, the adhesive tape 21 is mounted on the adhesive tape mounting roller 22, and the brake 23 is configured to control a rotation state of the adhesive tape mounting roller 22.

In the embodiments of this application, as shown in FIG. 1, the adhesive tape attaching device for cell includes a mounting plate 100, and the adhesive tape mounting roller 22 is pivotally mounted on the mounting plate 100. The adhesive tape mounting roller 22 is configured to carry a roll of adhesive tape 21. When the adhesive tape clamping and pulling mechanism 3 pulls the adhesive tape 21 in a horizontal direction leaving the adhesive tape preparation mechanism 2, the adhesive tape mounting roller 22 rotates under an action of a pulling force, thereby separating and transporting the adhesive tape 21. The brake 23 is configured to apply resistance to the adhesive tape mounting roller 22, and when the brake 23 is opened, the adhesive tape mounting roller 22 stops rotating. The brake 23 is configured to control the rotation state of the adhesive tape mounting roller 22, such as controlling whether the adhesive tape mounting roller 22 rotates, a rotation time, and the number of rotations. Specifically, when the cell 11 requires adhesive tape attaching, the brake 23 is turned off, so that the adhesive tape mounting roller 22 can rotate and transport the adhesive tape 21 to the cell 11 on the tooling plate 1. When the adhesive tape 21 does not need to be continuously transported in a direction to the cell 11, the brake 23 is turned on, and the adhesive tape mounting roller 22 stops rotating, which limits separation of the adhesive tapes 21, thereby reducing the probability of adhesion and wrinkles of the adhesive tape 21 caused by excessive separation of the adhesive tape 21 due to rotational inertia and other reasons during transportation of the adhesive tape 21.

In some embodiments, the brake 23 includes a magnetic powder clutch.

In some embodiments, as shown in FIG. 1, the adhesive tape attaching device for cell further includes an adhesive tape separation mechanism 7, where the adhesive tape separation mechanism 7 is located between the adhesive tape preparation mechanism 2 and the adhesive tape cutting mechanism 4, and the adhesive tape separation mechanism 7 is configured to provide downward pressure for the adhesive tape 21, so that at least part of the adhesive tape 21 is separated from the adhesive tape preparation mechanism 2. Specifically, the adhesive tape mounting roller 22 carries an adhesive tape roll. The adhesive tape separation mechanism 7 is configured to apply downward pressure on the adhesive tape 21, so that part of the adhesive tape 21 is peeled off the adhesive tape roll, to implement separation of the adhesive tape roll, so that the separated adhesive tape 21 is transported to the cell 11 onto which the adhesive tape is to be attached. In some embodiments, a length of the at least part of the adhesive tape 21 peeled off the adhesive tape roll is greater than or equal to a length of an adhesive tape segment to be attached onto the cell 11.

In some embodiments, the adhesive tape separation mechanism 7 includes a first through roller 71, a second through roller 72, and a third through roller 73 that are disposed on the mounting plate 100, the second through roller 72 is located between the first through roller 71 and the third through roller 73, the second through roller 72 can move in a vertical direction, and the adhesive tape 21 passes the highest point of the first through roller 71, the lowest point of the second through roller 72, and the highest point of the third through roller 73 in sequence.

In the embodiments of this application, the first through roller 71, the second through roller 72, and the third through roller 73 are all pivotally mounted on the mounting plate 100, that is, the first through roller 71, the second through roller 72, and the third through roller 73 can rotate around their own axis. During a process of the adhesive tape 21 being transported by the adhesive tape preparation mechanism 2 in a direction approaching the cell 11, the adhesive tape 21 passes the lowest point of the second through roller 72, and the second through roller 72 may move in a vertical direction, so that the second through roller 72 drives the adhesive tape 21 move together in the vertical direction, providing downward pressure for the adhesive tape 21. When the second through roller 72 moves below the adhesive tape roll on the adhesive tape mounting roller 22, part of the adhesive tape 21 is separated from the adhesive tape roll under an action of the second through roller 72, so that the adhesive tape 21 is separated.

The first through roller 71 and the third through roller 73 are respectively located on two sides of the second through roller 72 and configured to support the adhesive tape 21 and guide the adhesive tape 21. Optionally, the adhesive tape roll is cylindrical, and in a height direction, the height of the axis of the first through roller 71 is higher than the height of the lowest generatrix of the cylindrical adhesive tape roll, so that the adhesive tape 21 located between the adhesive tape mounting roller 22 and the first through roller 71 is tangent to an outer side of the adhesive tape roll or forms an acute angle with the adhesive tape roll, which reduces a pulling force required for separating the adhesive tape 21 and ensures stability of the adhesive tape separation mechanism 2.

In some embodiments, as shown in FIG. 1, the adhesive tape attaching device for cell further includes a first guide roller 8 and a second guide roller 9, where the first guide roller 8 and the second guide roller 9 are located between the adhesive tape separation mechanism 7 and the adhesive tape cutting mechanism 4, and the adhesive tape 21 passes the lowest point of the first guide roller 8 and the highest point of the second guide roller 9 in sequence.

In the embodiments of this application, the first guide roller 8 and the second guide roller 9 are configured to support the adhesive tape 21 and guide the adhesive tape 21. When the adhesive tape 21 is transported by the adhesive tape preparation mechanism 2 to the tooling plate 1, the adhesive tape 21 passes, in sequence, the highest point of the first through roller 71, the lowest point of the second through roller 72, the highest point of the third through roller 73, the lowest point of the first guide roller 8, and the highest point of the second guide roller 9, and the plurality of through rollers and guide rollers make the adhesive tape 21 in a tense state, reducing the probability of adhesion and wrinkles of the adhesive tape.

In some embodiments, two ends of the through roller are provided with annular protrusions, and the adhesive tape 21 is located between the two annular protrusions of each through roller. The two annular protrusions limit a position of the adhesive tape 21, reducing the probability of the adhesive tape 21 slipping from the through roller during transportation, where the through roller is at least one of the first through roller 71, the second through roller 72, the third through roller 73, the first guide roller 8, and the second guide roller 9.

In some embodiments, the through roller is coated with a coating layer to protect the through roller and reduce the probability of the through roller being corroded. In addition, the coating layer also serves to reduce the probability of the adhesive tape 21 adhering to the through roller. The coating layer includes but is not limited to a Teflon coating layer, a ceramic coating layer, and the like.

In some embodiments, the through roller is provided with a toothed structure, to reduce a contact area between the adhesive tape 21 and the through roller, further reducing the probability of the adhesive tape 21 adhering to the through roller.

In some embodiments, the adhesive tape separation mechanism 7 further includes a first track 74 disposed on the mounting plate 100 and extending in a vertical direction, and the second through roller 72 is slidably connected to the first track 74. The motor 61 is further configured to synchronously drive the adhesive tape clamping and pulling mechanism 3, the adhesive tape cutting mechanism 4, the adhesive tape attaching mechanism 5, and the second through roller 72.

In the embodiments of this application, the motor 61 is further configured to drive the second through roller 72 through the transmission assembly 62. In some embodiments, the motor 61 drives the second through roller 72 through the first cam 6211. Specifically, as shown in FIG. 1, the adhesive tape separation mechanism 7 further includes a first slider 75 slidably connected to the first track 74, and the second through roller 72 is disposed on the first slider 75. One end of the connecting rod 624 is provided with a third pressing block 6243, and the third pressing block 6243 corresponds to the first slider 75 and is placed above the first slider 75. The other end of the connecting rod 624 is connected to the first cam 6211, so that the motor 61 can drive the first slider 75 and the second through roller 72 through the first cam 6211 and the connecting rod 624. Specifically, the motor 61 drives the first cam 6211 to rotate through the output shaft 63. The rolling wheel 622 located above the first cam 6211 moves along an edge of the first cam 6211, thereby driving the first connecting plate 623 connected to the rolling wheel 622 to move in a vertical direction. Then, the third pressing block 6243 connected to the connecting rod 624 is driven, by the connecting rod 624, to move. Thus, the first slider 75 located below the third pressing block 6243 and the second through roller 72 fixed onto the first slider 75 move in a vertical direction.

Specifically, during separation of the adhesive tape, the first cam 6211 drives, through the connecting rod 624, the third pressing block 6243 to move downward, so that the third pressing block 6243 hits the first slider 75, making the first slider 75 and the second through roller 72 move downward. Then, the first cam 6211 continues to rotate to drive the connecting rod 624 and the third pressing block 6243 to move upward to reset. At this time, the first slider 75 and the second through roller 72 are still located below under actions of their own gravity and press the adhesive tape 21. When the adhesive tape clamping and pulling mechanism 3 clamps and pulls the adhesive tape 21, the adhesive tape clamping and pulling mechanism 3 overcomes the gravity of the first slider 75 and the second through roller 72, that is, the adhesive tape clamping and pulling mechanism 3 drives the adhesive tape 21 and makes the adhesive tape 21 drive the first slider 75 and the second through roller 72 to move upward to reset.

Figure 3:
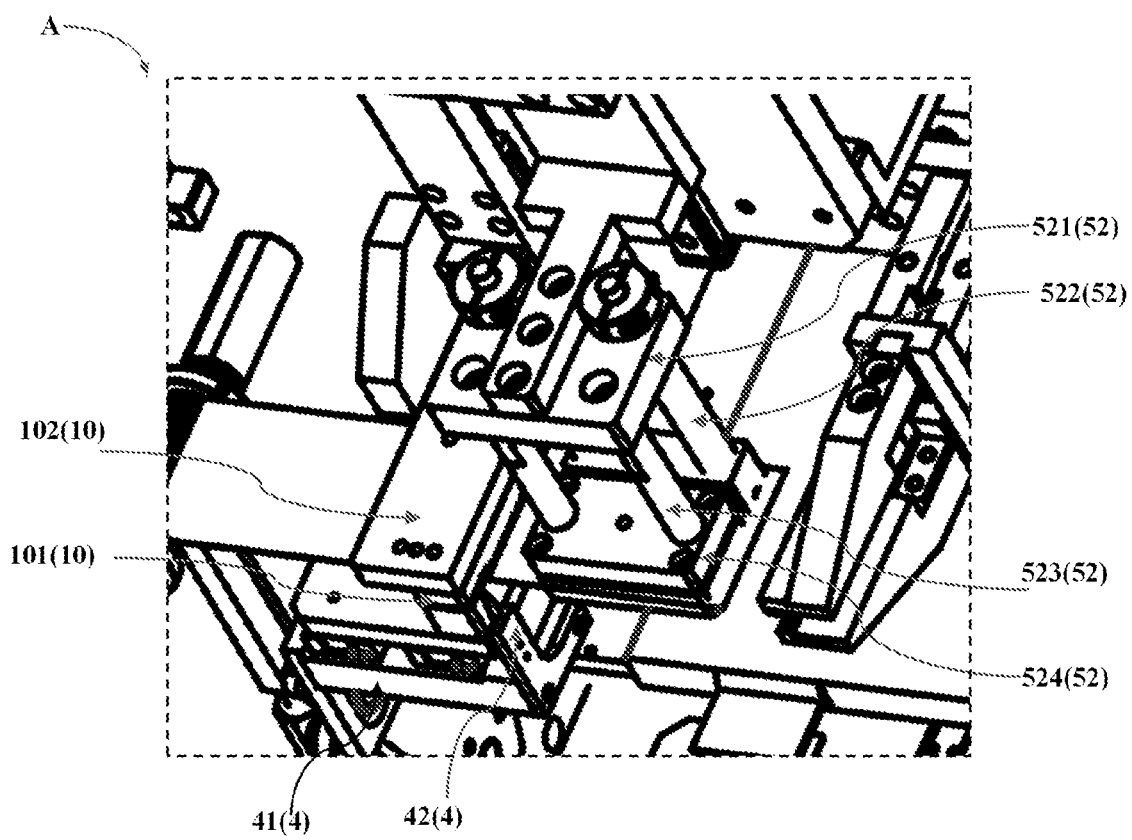
FIG. 3 is an enlarged view of region A in FIG. 2.
Figure 5:
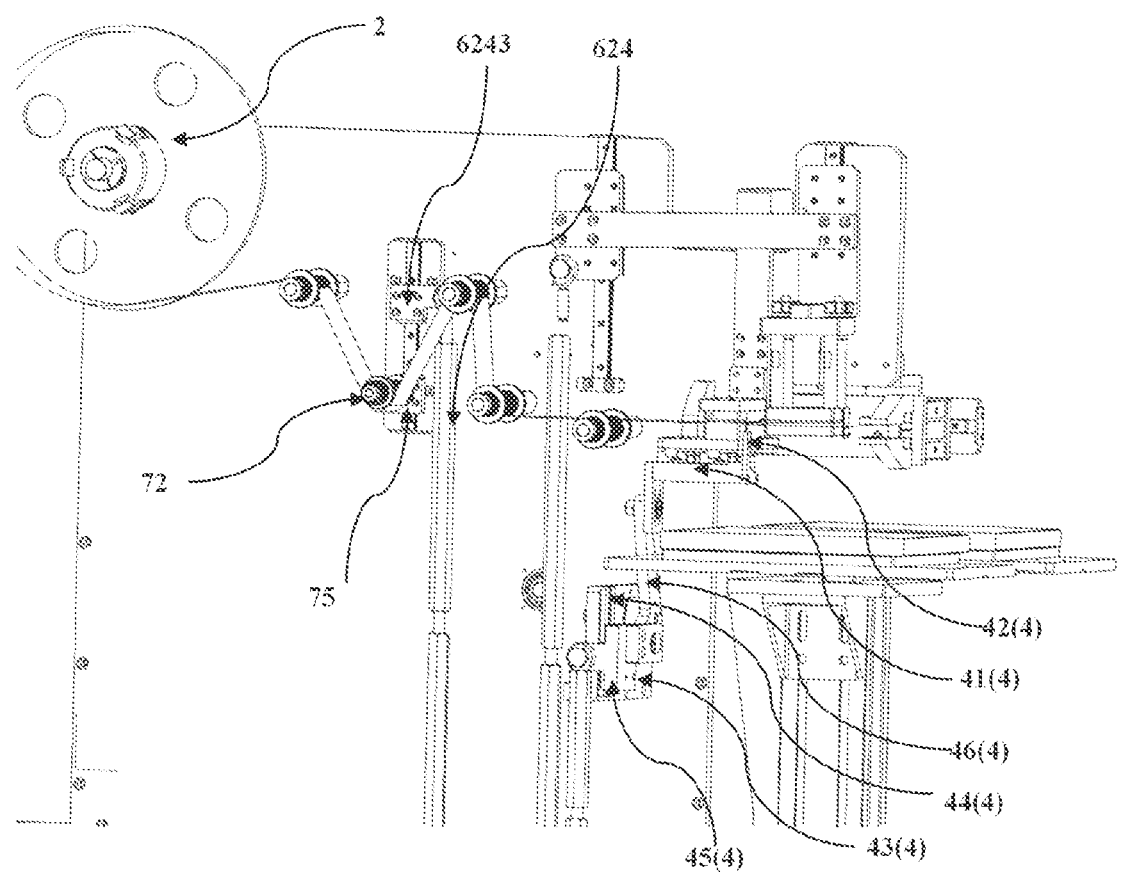
FIG. 5 is a partial structural diagram of an adhesive tape attaching device for cell according to some embodiments of this application.

In some embodiments, as shown in FIG. 3 and FIG. 5, the adhesive tape attaching device for cell further includes an adhesive tape pressing mechanism 10, the adhesive tape pressing mechanism 10 is located on the side of the adhesive tape cutting mechanism 4 leaving the tooling plate 1, and the adhesive tape pressing mechanism 10 is configured to fix the adhesive tape 21.

In the embodiments of this application, as shown in FIG. 2, the adhesive tape pressing mechanism 10 is located between the adhesive tape cutting mechanism 4 and the second guide roller 9. When the adhesive tape 21 reaches the adhesive tape pressing mechanism 10 through the second guide roller 9, the adhesive tape pressing mechanism 10 fixes the adhesive tape 21, so that when the adhesive tape cutting mechanism 4 cuts the adhesive tape 21, the adhesive tape 21 does not move or wrinkle, which reduces difficulty in cutting the adhesive tape 21 by the adhesive tape cutting mechanism 4 and improves efficiency of the adhesive tape cutting mechanism 4.

In some embodiments, the adhesive tape pressing mechanism 10 includes a support block 101 and an adhesive tape pressing slider 102 located above the support block 101, the adhesive tape pressing slider 102 can move in a vertical direction, so that the adhesive tape 21 is located between the adhesive tape pressing slider 102 and the support block 101. The motor 61 is further connected to the adhesive tape pressing slider 102 through the transmission assembly 62, to synchronously drive the adhesive tape clamping and pulling mechanism 3, the adhesive tape cutting mechanism 4, the adhesive tape attaching mechanism 5, and the adhesive tape pressing slider 102.

In the embodiments of this application, in a process of the adhesive tape 21 being transported by the adhesive tape preparation mechanism 2 to the tooling plate 1, when the adhesive tape 21 passes the adhesive tape pressing mechanism 10, the adhesive tape 21 is located between the adhesive tape pressing slider 102 and the support block 101. The motor 61 drives, through the transmission assembly 62, the adhesive tape pressing slider 102 to move downward until the adhesive tape pressing slider 102 contacts the support block 101, and the adhesive tape pressing slider 102 presses and attaches the adhesive tape 21 onto the support block 101 to fix the adhesive tape 21.

Specifically, the motor 61 drives, through the second cam 6212, the adhesive tape pressing slider 102 to move in a vertical direction. The second cam 6212 in the transmission assembly 62 is connected to one end of the connecting rod 624 through the first connecting plate 623, and the other end of the connecting rod 624 is connected to the adhesive tape pressing slider 102. The motor 61 drives the second cam 6212 to rotate, so that the cam 6212 drives, through the first connecting plate 623, the connecting rod 624 to move in a vertical direction, thereby driving the adhesive tape pressing slider 102 connected to the connecting rod 624 to move in the vertical direction.

In some embodiments, during attaching of the adhesive tape, the brake 23 is turned off, and the motor 61 drives, through the first cam 6211, the second through roller 72 and the first slider 75 to move downward, so that the second through roller 72 drives the adhesive tape 21 to move downward to be separated. At this time, the support block 101 in the adhesive tape pressing mechanism 10 is attached to the adhesive tape pressing slider 102 to fix the adhesive tape 21 between the support block 101 and the adhesive tape pressing slider 102. After the adhesive tape is separated, the second cam 6212 drives the adhesive tape pressing slider 102 to move upward, so that the adhesive tape pressing mechanism 10 is opened, at the same time, the adhesive tape clamping and pulling mechanism 3 drives the adhesive tape 21 to move, the adhesive tape cutting mechanism 4 cuts the adhesive tape 21 into adhesive tape segments, and the adhesive tape attaching mechanism 5 attaches the adhesive tape segment onto the cell 11, to complete an adhesive tape attaching process.

In some embodiments, an upper surface of the support block 101 is coated with a coating layer to reduce the probability of the adhesive tape 21 adhering to the support block 101. The coating layer includes but is not limited to a Teflon coating layer, a ceramic coating layer, and the like.

In some embodiments, in a height direction, the height of an axis of the second guide roller 9 is lower than the height of the upper surface of the support block 101. After adhesive tape attaching is performed for the cell 11, the adhesive tape pressing slider 102 moves upward, and part of the adhesive tape 21 is still attached onto the upper surface of the support block 101. During adhesive tape attaching for a next cell 11, the adhesive tape clamping and pulling mechanism 3 continues to clamp one end of the adhesive tape 21 leaving the adhesive tape preparation mechanism 2, and then the adhesive tape clamping and pulling mechanism 3 clamps the adhesive tape 21 to move horizontally. Because the height of the axis of the second guide roller 9 is higher than the height of the upper surface of the support block 101, when the adhesive tape clamping and pulling mechanism 3 clamps the adhesive tape 21 and applies a pulling force on the adhesive tape 21, the adhesive tape 21 is separated from the upper surface of the support block 101, and then is leveled and raised to a height close to those of the adhesive tape clamping and pulling mechanism 3 and the second guide roller 9. Therefore, the probability of the adhesive tape 21 adhering to the upper surface of the support block 101 is reduced, and the probability of wrinkles of the adhesive tape 21 is reduced.

In some embodiments, as shown in FIG. 3, FIG. 4, and FIG. 5, the adhesive tape pressing mechanism 10 further includes a third guide rail 103 disposed on the mounting plate 100 and a third slider 104 slidably connected to the third guide rail 103. The third guide rail 103 extends in a vertical direction. The third slider 104 is connected to the connecting rod 624, and the third slider 104 is connected to the adhesive tape pressing slider 102. When the motor 61 drives the second cam 6212 through the output shaft 63, the second cam 6212 drives, through the first connecting plate 623, the connecting rod 624 to move in a vertical direction, driving the third slider 104 connected to the connecting rod 624 to move on the third guide rail 103, thereby driving the adhesive tape pressing slider 102 connected to the third slider 104 to move in a vertical direction.

In some embodiments, as shown in FIG. 1, the adhesive tape attaching mechanism 5 includes a second guide rail 51 extending in a vertical direction and a pressing block structure 52 slidably connected to the second guide rail 51, and the motor 61 is connected to the pressing block structure 52 through transmission assembly 62, to drive the pressing block structure 52 to slide relative to the second guide rail 51. Specifically, the motor 61 drives, through the third cam 6213, the pressing block mechanism 52 to slide relative to the second guide rail 51.

In the embodiments of this application, the second guide rail 51 is disposed on the mounting plate 100. The adhesive tape attaching mechanism 5 further includes a second slider 53 slidably connected to the second guide rail 51. The second slider 53 is connected to the connecting rod 624 of the transmission assembly 62, and the second slider 53 is connected to the pressing block structure 52. The motor 61 drives, through the third cam 6213, the connecting rod 624 to move in a vertical direction, driving the second slider 53 connected to the connecting rod 624 to move on the second guide rail 51, thereby driving the pressing block structure 52 connected to the second slider 53 to move in a vertical direction. During adhesive tape attaching for the cell 11, the pressing block structure 52 is controlled to move downward until the pressing block structure 52 contacts the adhesive tape 21 and attaches the adhesive tape 21 onto a to-be-attached region of the cell 11.

In some embodiments, the adhesive tape attaching mechanism 5 further includes a fourth guide rail 54 disposed on the mounting plate 100 and a fourth slider 55 slidably connected to the fourth guide rail 54. The adhesive tape attaching mechanism 5 further includes a transmission member 56, the transmission member 56 is connected to the second slider 53 and the fourth slider 55, and the pressing block structure 52 may be connected to the fourth slider 55. Because the second slider 53 is connected to the fourth slider 55 through the transmission member 56, the motor 61 drives the second slider 53 and the fourth slider 55 to respectively move on the second guide rail 51 and the fourth guide rail 54, thereby driving the pressing block structure 52 connected to the fourth slider 55 to move in a vertical direction. The adhesive tape attaching mechanism 5 is of a dual-guide rail structure (the second guide rail 51 and the fourth guide rail 54), which makes the pressing block structure 52 more stable during moving, and makes the adhesive tape 21 attached onto the cell 11 more flat.

In some embodiments, the pressing block structure 52 includes a first pressing block 521, at least one first connecting rod 522, at least one second connecting rod 523, and a second pressing block 524. The first pressing block 521 is connected to the transmission assembly 62, the first pressing block 521 is connected to the second pressing block 524 through the at least one first connecting rod 522 and the at least one second connecting rod 523, and the at least one first connecting rod 522 or the at least one second connecting rod 523 includes an elastic member.

In the embodiments of this application, a tab protrudes from an end surface of the cell 11. When a to-be-attached region of the cell 11 is the tab of the cell 11, the adhesive tape 21 needs to cover the tab of the cell 11 and extend to a side surface of the cell 11 adjacent to the end surface on which the tab is located (which is referred to as a large surface of the cell for short in the following). There is a step-shaped transition between the tab of the cell 11 and the large surface of the cell. The first pressing block 521 is connected to the second pressing block 524 through the first connecting rod 522 or the second connecting rod 523. Because the first connecting rod 522 or the second connecting rod 523 is provided with the elastic member, when the pressing block structure 52 entirely moves downward and contacts the large surface of the cell 11, the elastic member buffers the pressing block structure 52 and provides room for the pressing block structure 52 to continuously move downward, so that part of the pressing block structure 52 continues to move downward to contact the tab of the cell, and the adhesive tape 21 can be attached onto the large surface of the cell and the tab of the cell. A connecting rod having the elastic member is located above the large surface of the cell, and a connecting rod having no elastic member is located above the tab of the cell.

In an example, the second pressing block 524 includes a first portion and a second portion. The first connecting rod 522 is provided with an elastic member, and the first connecting rod 522 is connected to the first portion. The second connecting rod 523 is connected to the second portion. When the pressing block structure 52 entirely moves to contact the large surface of the cell, the pressing block structure 52 continues to move downward, and the elastic member on the first connecting rod 522 is compressed, so that the first portion still contacts the large surface of the cell. The second portion continues to move downward until the second portion contacts the tab of the cell 11, and the adhesive tape 21 is attached onto the large surface of the cell and the tab under actions of the first portion and the second portion, to implement stepped adhesive tape attaching, so that the adhesive tape 21 is attached onto the cell 11 more flat. The elastic member includes but is not limited to a spring, an elastic sheet, and the like.

In some embodiments, as shown in FIG. 3, the pressing block structure 52 includes two first connecting rods 522 and two second connecting rods 523.

In some embodiments, the adhesive tape cutting mechanism 4 includes a fixing block 41 and a cutter 42 disposed on the fixing block 41. The fixing block 41 is connected to the cam driving group, to move in a direction horizontal and perpendicular to an adhesive tape transportation direction under an action of the cam driving group, thereby driving the cutter 42 disposed on the fixing block 41 to move so as to cut the adhesive tape 21. Specifically, the fixing block 41 moves in the direction horizontal and perpendicular to the adhesive tape transportation direction under an action of the fourth cam 6214 of the cam driving group.

In some embodiments, the adhesive tape cutting mechanism 4 further includes a second connecting plate 43 disposed on the mounting plate 100, a fifth track 44 disposed on the second connecting plate 43, a fifth slider 45 slidably connected to the fifth track 44, and a third connecting plate 46. The fifth track 44 extends in a vertical direction. One end of the connecting rod 624 is connected to the fourth cam 6214 through the first connecting plate 623, and the other end is fixedly connected to the fifth slider 45. The third connecting plate 46 is pivotally mounted on the second connecting plate 43, one end of the third connecting plate 46 is fixedly connected to the fifth slider 45, and the other end of the third connecting plate 46 is fixedly connected to the fixing block 41.

Specifically, when the adhesive tape 21 needs to be cut by the adhesive tape cutting mechanism 4, the fourth cam 6214 drives the connecting rod 624 to move in a vertical direction, thereby driving the fifth slider 45 fixedly connected to the connecting rod 624 to slide relative to the fifth track 44, and driving one end of the third connecting plate 46 fixedly connected to the fifth slider 45 to move in a substantially vertical direction. Because the third connecting plate 46 may rotate relative to the second connecting plate 43, the other end of the third connecting plate 46 moves in a substantially horizontal direction, thereby driving the fixing block 41 fixedly connected to the third connecting plate 46 to move in a horizontal direction, and then driving the cutter 42 disposed on the fixing block 41 to move so as to cut the adhesive tape 21.

In some embodiments, the fixing block 41 is provided with a slot, and the cutter 42 is inserted into the slot.

In some embodiments, the fixing block 41 is magnetically attached onto the cutter 42.

In some embodiments, as shown in FIG. 2 and FIG. 4, the adhesive tape clamping and pulling mechanism 3 includes a sixth guide rail 31 disposed on the mounting plate 100 and extending in a horizontal direction, a sixth slider 32 slidably connected to the sixth guide rail 31, and the clamping jaw 33 fixedly connected to the sixth slider 32. The motor 61 is connected to the sixth slider 32 through the cam driving group to drive the sixth slider 32 to slide on the sixth guide rail 31, thereby driving the clamping jaw 33 fixedly connected to the sixth slider 32 to move in a horizontal direction. Specifically, the motor 61 drives, through the fifth cam 6215 and the connecting rod 624, the sixth slider 32 to slide relative to the sixth guide rail 31.

In some embodiments, the adhesive tape clamping and pulling mechanism 3 further includes a fourth connecting plate 34 pivotally mounted on the mounting plate 100. One end of the fourth connecting plate 34 is connected to the connecting rod 624, and the other end of the fourth connecting plate 34 is fixedly connected to the sixth slider 32. Specifically, the motor 61 drives, through the fifth cam 6215, the connecting rod 624 to move in a vertical direction, thereby driving the end of the fourth connecting plate 34 connected to the connecting rod 624 to move in a vertical direction, so that the fourth connecting plate 34 entirely rotates relative to the mounting plate 100, to drive the other end of the fourth connecting plate 34 to move in a horizontal direction, and then drive the sixth slider 32 fixedly connected to the other end of the fourth connecting plate 34 to move on the sixth guide rail 31, thereby driving the clamping jaw 33 connected to the sixth slider 32 to move in a horizontal direction. In some embodiments, when the clamping jaw 33 grabs the adhesive tape 21, the clamping jaw 33 moves in a horizontal direction approaching the adhesive tape attaching mechanism 5. After grabbing the adhesive tape 21, the clamping jaw 33 drives the adhesive tape 21 to move in a horizontal direction leaving the adhesive tape attaching mechanism 5.

In some embodiments, the adhesive tape attaching device for cell includes a frame, and the adhesive tape preparation mechanism 2, the adhesive tape clamping and pulling mechanism 3, the adhesive tape cutting mechanism 4, the adhesive tape attaching mechanism 5, the driving mechanism 6, the adhesive tape separation mechanism 7, and the adhesive tape pressing mechanism 10 are all arranged on the rack. In addition, the mounting plate 100 is fixedly connected to the frame. In some embodiments, the driving mechanism 6 is disposed on the frame and located below the mounting plate 100, so that the overall center of gravity of the adhesive tape attaching device for cell moves downward, increasing stability of the adhesive tape attaching device for cell.

In some embodiments, the transmission assembly 62 further includes an elastic structure, where the elastic structure is connected to the cam 621. The elastic structure is configured to apply pressure or a pulling force on the cam 621, so that the cam 621 always closely contacts the rolling wheel 622 on the first connecting plate 623 during rotation, and therefore the rolling wheel 622 can move along a contour of the cam 621. In some embodiments, the elastic structure may be disposed below the cam 621. During the rotation of the cam 621, the elastic structure applies upward pressure on the cam 621 through a rebound force of the elastic structure, so that the cam 621 always closely contacts the rolling wheel 622 above the cam 621 during the rotation. The elastic structure may alternatively be disposed above the cam 621. During the rotation of the cam 621, the elastic structure applies an upward pulling force on the cam 621 through a retraction force of the elastic structure, so that the cam 621 always closely contacts the rolling wheel 622 above the cam 621 during the rotation. The elastic structure includes but is not limited to a spring, an elastic sheet, and the like.

Specifically, in the embodiments of this application, the cam 621 may include the first cam 6211, the second cam 6212, the third cam 6213, the fourth cam 6214, and the fifth cam 6215, and each cam 6215 is correspondingly provided with one first connecting plate 623. Some of the five cams may be of an upper fixing structure of the elastic structure, and others may be of a lower fixing structure of the elastic structure, so that internal space of the adhesive tape attaching device for cell can be fully utilized, thereby saving the internal space of the adhesive tape attaching device for cell and reducing the volume of the adhesive tape attaching device for cell. In an example, as shown in FIG. 4 and FIG. 6, the third cam 6213 (driving the adhesive tape attaching mechanism 5), the fourth cam 6214 (driving the adhesive tape cutting mechanism 4), and the fifth cam 6215 (driving the adhesive tape clamping and pulling mechanism 3) are of the lower fixing structure of the elastic structure; and the first cam 6211 (driving the adhesive tape separation mechanism 7) and the second cam 6212 (driving the adhesive tape pressing mechanism 10) are of the upper fixing structure of the elastic structure.

In the embodiments of this application, the cam 621 may be connected to a to-be-driven mechanism through two connecting rods 624 (an upper connecting rod 6244 and a lower connecting rod 6245). Specifically, as shown in FIG. 4, the cam driving group further includes a first intermediate piece 627 and a second intermediate piece 628. The cam 621 is connected to one end of the lower connecting rod 6245 through the first connecting plate 623, the other end of the lower connecting rod 6245 is connected to one end of the first intermediate piece 627, the other end of the first intermediate piece 627 is connected to one end of a second connecting piece 628, one end of the second intermediate piece 628 is connected to one end of the upper connecting rod 6244, and the other end of the upper connecting rod 6244 is connected to the to-be-driven mechanism. In some embodiments, a process of the cam 621 driving the to-be-driven mechanism through the upper connecting rod 6244 and the lower connecting rod 6245 is as follows. The cam 621 rotates to drive the lower connecting rod 6245 to move in a vertical direction, thereby driving one end of the first intermediate piece 627 to move in a substantially vertical direction, and then driving the first intermediate piece 627 to rotate around a fixed point (point O in FIG. 4). The first intermediate piece 627 drives the second intermediate piece 628 fixedly connected to the first intermediate piece 627 to rotate around a fixed point, thereby driving the upper connecting rod 6245 connected to one end of the second intermediate piece 628 to move in a vertical direction, and finally driving the to-be-driven mechanism.

When the cam 621 is of a fixing structure of an upper elastic structure, the first connecting plate 623 is located on a lower side of a center point of the cam 621, and when the cam 621 is of a fixing structure of a lower elastic structure, the first connecting plate 623 is located on an upper side of the center point of the cam 621. Therefore, a corresponding length of the lower connecting rod 6245 when the cam 621 is of the fixing structure of the upper elastic structure is greater than a corresponding length of the lower connecting rod 6245 when the cam 621 is of the fixing structure of the lower elastic structure. For example, as shown in FIG. 6, a length of the lower connecting rod 6245 corresponding to the second cam 6212 is greater than a length of the lower connecting rod 6245 corresponding to the fifth cam 6215.

In the embodiments of this application, during adhesive tape attaching by the adhesive tape attaching device for cell, the brake 23 is turned off, the motor 61 drives the output shaft 63 to rotate, the adhesive tape pressing slider 102 in the adhesive tape pressing mechanism 10 is attached to the support block 101 (where the adhesive tape pressing mechanism 10 is closed), and at the same time, the second through roller 72 of the adhesive tape separation mechanism 7 moves downward, driving the adhesive tape 21 to move downward, so that part of the adhesive tape 21 (where a length is greater than a length of a required adhesive tape section) is peeled off the adhesive tape roll, and the brake 23 is turned on. Then, the adhesive tape pressing slider 102 moves upward (where the adhesive tape pressing mechanism 10 is opened), and at the same time, the adhesive tape clamping and pulling mechanism 3 clamps the adhesive tape 21 and drives the adhesive tape 21 to move forward. The adhesive tape cutting mechanism 4 cuts the adhesive tape 21 transported to the adhesive tape cutting mechanism 4 into adhesive tape segments, and the adhesive tape attaching mechanism 5 attaches the adhesive tape segment onto the cell 11. In this case, the output shaft 63 rotates one rotation, and an adhesive tape attaching process is completed. It can be seen that stability and sustainability of the adhesive tape attaching device for cell in the embodiments of this application are high. In addition, all parts of the adhesive tape attaching device for cell can operate synchronously. For example, the adhesive tape cutting mechanism 4 completes cutting, and in a process of the adhesive tape pressing mechanism 10 pressing the adhesive tape, the adhesive tape preparation mechanism 2 may operate synchronously to separate the adhesive tape, thus improving working efficiency of the entire device.

Figure 7:
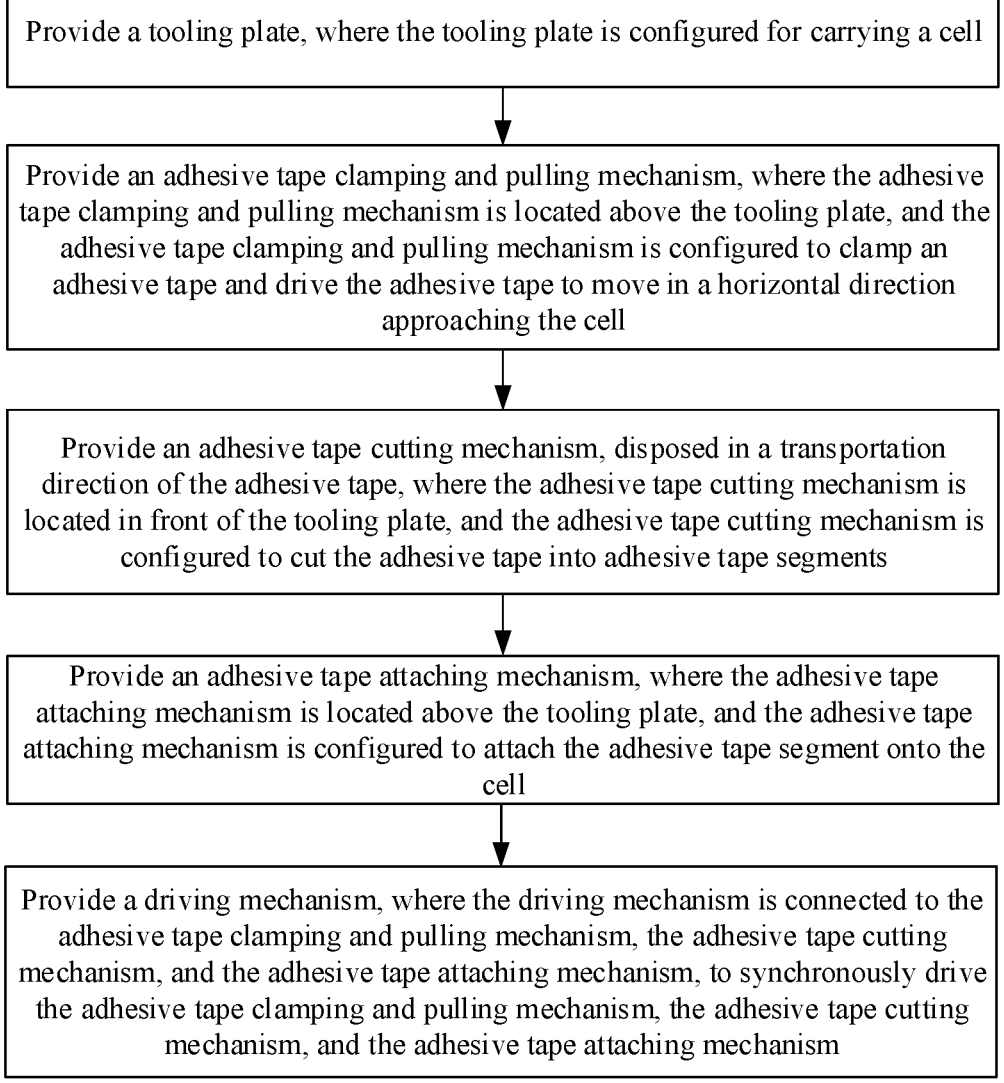
FIG. 7 is a flowchart of a manufacturing method for an adhesive tape attaching device for cell according to some embodiments of this application.

A second aspect of an embodiment of this application provides a manufacturing method for an adhesive tape attaching device for cell. As shown in FIG. 7, the manufacturing method for an adhesive tape attaching device for cell includes the following steps: providing a tooling plate, where the tooling plate is configured for carrying a cell; providing an adhesive tape clamping and pulling mechanism, where the adhesive tape clamping and pulling mechanism is located above the tooling plate, and the adhesive tape clamping and pulling mechanism is configured to clamp an adhesive tape and drive the adhesive tape to move in a horizontal direction approaching the cell; providing an adhesive tape cutting mechanism, disposed in a transportation direction of the adhesive tape, where the adhesive tape cutting mechanism is located in front of the tooling plate, and the adhesive tape cutting mechanism is configured to cut the adhesive tape into adhesive tape segments; providing an adhesive tape attaching mechanism, where the adhesive tape attaching mechanism is located above the tooling plate, and the adhesive tape attaching mechanism is configured to attach the adhesive tape segment onto the cell; and providing a driving mechanism, where the driving mechanism includes a motor and a transmission assembly, and the motor is connected, through the transmission assembly, to the adhesive tape clamping and pulling mechanism, the adhesive tape cutting mechanism, and the adhesive tape attaching mechanism, to synchronously drive the adhesive tape clamping and pulling mechanism, the adhesive tape cutting mechanism, and the adhesive tape attaching mechanism.

In an adhesive tape attaching device for cell manufactured by using the manufacturing method for an adhesive tape attaching device for cell according to this embodiment of this application, adhesive tape attaching for the cell is implemented by the adhesive tape clamping and pulling mechanism, the adhesive tape cutting mechanism, and the adhesive tape attaching mechanism, featuring a high degree of automation. Driven by the adhesive tape clamping and pulling mechanism on the cell, the adhesive tape passes the adhesive tape cutting mechanism and the adhesive tape attaching mechanism in sequence, and is attached onto the cell under an action of the adhesive tape attaching mechanism. A transportation path of the adhesive tape is short, and cooperation between the mechanisms is close, which increases adhesive tape attaching efficiency of the adhesive tape attaching device for cell. In addition, the driving mechanism uses a same motor to synchronously drive a plurality of mechanisms, which reduces the volume and energy consumption of the adhesive tape attaching device for cell on the basis of further improving working efficiency of the adhesive tape attaching device for cell.

It should be noted that in this specification, relational terms such as "first" and "second" are used only to differentiate an entity or operation from another entity or operation, and do not necessarily require or imply that any actual relationship or sequence exists between these entities or operations. Terms "comprise", "include", or any other variations thereof are intended to cover non-exclusive inclusions, such that a process, a method, an article, or a device including a series of elements not only includes these elements, but also includes other elements which are not expressly listed, or further includes elements which are inherent to such process, method, article or device. In absence of more constraints, an element preceded by the statement "includes a . . . " does not preclude existence of other identical elements in the process, method, article, or device that includes the element.

The foregoing descriptions are merely preferred examples of this application, and are not intended to limit the protection scope of this application. Any modification, equivalent replacement, and improvement made without departing from the spirit and principle of this application shall fall within the protection scope of this application.

The invention claimed is:

1. An adhesive tape attaching device for cell, comprising:
a tooling plate, configured for carrying a cell; and
an adhesive tape clamping and pulling mechanism, located above the tooling plate, wherein the adhesive tape clamping and pulling mechanism is configured to clamp an adhesive tape and drive the adhesive tape to move in a horizontal direction approaching the cell;
an adhesive tape cutting mechanism, disposed in a transportation direction of the adhesive tape, wherein the adhesive tape cutting mechanism is located upstream of the tooling plate, and the adhesive tape cutting mechanism is configured to cut the adhesive tape into adhesive tape segments;
an adhesive tape attaching mechanism, located above the tooling plate, wherein the adhesive tape attaching mechanism is configured to attach the adhesive tape segment onto the cell; and
a driving mechanism, wherein the driving mechanism is connected to the adhesive tape clamping and pulling mechanism, the adhesive tape cutting mechanism, and the adhesive tape attaching mechanism, to synchronously drive the adhesive tape clamping and pulling mechanism, the adhesive tape cutting mechanism, and the adhesive tape attaching mechanism, wherein the driving mechanism comprises:
an output shaft; and
at least one cam driving group, wherein the at least one cam driving group is driven by the output shaft.

2. The adhesive tape attaching device for cell according to claim 1, wherein the driving mechanism comprises a motor and a transmission assembly, wherein the motor is connected, through the transmission assembly, to the adhesive tape clamping and pulling mechanism, the adhesive tape cutting mechanism, and the adhesive tape attaching mechanism, to synchronously drive the adhesive tape clamping and pulling mechanism, the adhesive tape cutting mechanism, and the adhesive tape attaching mechanism.

3. The adhesive tape attaching device for cell according to claim 2, wherein the adhesive tape attaching device for cell further comprises an adhesive tape preparation mechanism, the adhesive tape preparation mechanism is located on a side of the adhesive tape cutting mechanism leaving the tooling plate, and the adhesive tape preparation mechanism is configured to carry the adhesive tape and transport the adhesive tape in a direction approaching the tooling plate.

4. The adhesive tape attaching device for cell according to claim 1, wherein each of the cam driving groups comprises:
a cam, fixedly connected to the output shaft;
a rolling wheel, wherein the rolling wheel is disposed on a first connecting plate, and the cam abuts against the rolling wheel; and
the first connecting plate and a connecting rod having two ends, wherein one end of the connecting rod is connected to the first connecting plate, the other end of the connecting rod is connected to a to-be-driven mechanism, the cam drives the connecting rod to move in a vertical direction through the rolling wheel and the first connecting plate, and the to-be-driven mechanism is at least one of the adhesive tape clamping and pulling mechanism, the adhesive tape cutting mechanism, and the adhesive tape attaching mechanism.

5. The adhesive tape attaching device for cell according to claim 4, wherein the connecting rod comprises a first section and a second section, the first section is threadedly connected to the second section, and a depth of the threaded connection between the first section and the second section is adjustable.

6. The adhesive tape attaching device for cell according to claim 4, wherein each cam driving group further comprises a first rod end bearing, one end of the connecting rod is connected to the first connecting plate through the first rod end bearing, the first rod end bearing is threadedly connected to the connecting rod, and a depth of the threaded connection between the connecting rod and the first rod end bearing is adjustable; and/or
  each cam driving group further comprises a second rod end bearing, the other end of the connecting rod is connected to the to-be-driven mechanism through the second rod end bearing, the second rod end bearing is threadedly connected to the connecting rod, and a depth of the threaded connection between the connecting rod and the second rod end bearing is adjustable.

7. The adhesive tape attaching device for cell according to claim 4, wherein the driving mechanism further comprises an encoder, and the encoder is configured to control a rotation angle of the cam.

8. The adhesive tape attaching device for cell according to claim 3, further comprising an adhesive tape separation mechanism, the adhesive tape separation mechanism is located between the adhesive tape preparation mechanism and the adhesive tape cutting mechanism, and the adhesive tape separation mechanism is configured to provide downward pressure for the adhesive tape, so that at least part of the adhesive tape is separated from the adhesive tape preparation mechanism.

9. The adhesive tape attaching device for cell according to claim 8, further comprising a mounting plate, the adhesive tape separation mechanism comprises a first through roller, a second through roller, and a third through roller that are disposed on the mounting plate, the second through roller is located between the first through roller and the third through roller, the second through roller is able to move in a vertical direction, and the adhesive tape passes a highest point of the first through roller, the lowest point of the second through roller, and the highest point of the third through roller in sequence.

10. The adhesive tape attaching device for cell according to claim 9, wherein the adhesive tape separation mechanism further comprises a first track disposed on the mounting plate and extending in a vertical direction, and the second through roller is slidably connected to the first track; and
  the motor is further configured to synchronously drive the adhesive tape clamping and pulling mechanism, the adhesive tape cutting mechanism, the adhesive tape attaching mechanism, and the second through roller.

11. The adhesive tape attaching device for cell according to claim 9, further comprising a first guide roller and a second guide roller, the first guide roller and the second guide roller are located between the adhesive tape separation mechanism and the adhesive tape cutting mechanism, and the adhesive tape passes the lowest point of the first guide roller and the highest point of the second guide roller in sequence.

12. The adhesive tape attaching device for cell according to claim 3, wherein the adhesive tape preparation mechanism comprises an adhesive tape mounting roller and a brake connected to the adhesive tape mounting roller, the adhesive tape is mounted on the adhesive tape mounting roller, and the brake is configured to control a rotation state of the adhesive tape mounting roller.

13. The adhesive tape attaching device for cell according to claim 1, further comprising an adhesive tape pressing mechanism, the adhesive tape pressing mechanism is located on a side of the adhesive tape cutting mechanism leaving the tooling plate, and the adhesive tape pressing mechanism is configured to fix the adhesive tape.

14. The adhesive tape attaching device for cell according to claim 13, wherein the adhesive tape pressing mechanism comprises a support block and an adhesive tape pressing slider located above the support block, the adhesive tape pressing slider is able to move in a vertical direction, so that the adhesive tape is located between the adhesive tape pressing slider and the support block; and
  the driving mechanism is connected to the adhesive tape pressing slider, to synchronously drive the adhesive tape clamping and pulling mechanism, the adhesive tape cutting mechanism, the adhesive tape attaching mechanism, and the adhesive tape pressing slider.

15. The adhesive tape attaching device for cell according to claim 1, wherein the adhesive tape attaching mechanism comprises a guide rail extending in a vertical direction and a pressing block structure slidably connected to the second guide rail, and the driving mechanism is connected to the pressing block structure to drive the pressing block structure to slide relative to the guide rail.

16. The adhesive tape attaching device for cell according to claim 15, wherein the pressing block structure comprises a first pressing block, at least one first connecting rod, at least one second connecting rod, and a second pressing block, wherein the first pressing block is connected to a transmission assembly, the first pressing block is connected to the second pressing block through the at least one first connecting rod and the at least one second connecting rod, and the at least one first connecting rod or the at least one second connecting rod comprises an elastic member.

17. The adhesive tape attaching device for cell according to claim 1, wherein the driving mechanism comprises a cylinder assembly; and
  the adhesive tape clamping and pulling mechanism comprises a first clamping block and a second clamping block, wherein the cylinder assembly is connected to the first clamping block and/or the second clamping block, to drive the first clamping block and/or the second clamping block to move in a vertical direction.

\* \* \* \* \*